US011987928B2

(12) United States Patent
Zhou et al.

(10) Patent No.: US 11,987,928 B2
(45) Date of Patent: May 21, 2024

(54) FABRIC COATING COMPOSITIONS

(71) Applicant: Hewlett-Packard Development Company, L.P., Spring, TX (US)

(72) Inventors: Xiaoqi Zhou, San Diego, CA (US); Zhang-Lin Zhou, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 151 days.

(21) Appl. No.: 17/417,590

(22) PCT Filed: Jul. 22, 2019

(86) PCT No.: PCT/US2019/042772

§ 371 (c)(1),
(2) Date: Jun. 23, 2021

(87) PCT Pub. No.: WO2021/015727

PCT Pub. Date: Jan. 28, 2021

(65) Prior Publication Data

US 2022/0136170 A1 May 5, 2022

(51) Int. Cl.

| | |
|---|---|
| ***D06P 1/50*** | (2006.01) |
| ***B41M 5/52*** | (2006.01) |
| ***D06P 1/52*** | (2006.01) |
| ***D06P 1/54*** | (2006.01) |
| ***D06P 5/22*** | (2006.01) |
| ***D06P 5/30*** | (2006.01) |

(52) U.S. Cl.

CPC ......... *D06P 1/5242* (2013.01); *B41M 5/5227* (2013.01); *B41M 5/5245* (2013.01); *B41M 5/5263* (2013.01); *D06P 1/54* (2013.01); *D06P 5/22* (2013.01); *D06P 5/30* (2013.01)

(58) Field of Classification Search

CPC .. D06P 1/5242; D06P 1/54; D06P 5/22; D06P 5/30; B41M 5/5227; B41M 5/5245; B41M 5/5263

USPC ........................................................ 428/32.16

See application file for complete search history.

(56) References Cited

U.S. PATENT DOCUMENTS

| | | | | |
|---|---|---|---|---|
| 5,223,028 A * | 6/1993 | Aulick .................. | C09D 11/30 523/160 |
| 5,240,767 A | 8/1993 | Umezu et al. | |
| 6,291,023 B1 | 9/2001 | Nigam | |
| 2003/0219539 A1* | 11/2003 | Nigam ..................... | B41M 5/52 427/372.2 |
| 2008/0124498 A1* | 5/2008 | Cole ...................... | B41M 5/267 428/29 |
| 2009/0226678 A1 | 9/2009 | Yatake et al. | |
| 2009/0226679 A1 | 9/2009 | Yatake et al. | |
| 2012/0306976 A1 | 12/2012 | Kitagawa et al. | |

(Continued)

FOREIGN PATENT DOCUMENTS

| | | |
|---|---|---|
| CN | 106604943 A | 4/2017 |
| DE | 2325308 | 11/1973 |

(Continued)

*Primary Examiner* — Betelhem Shewareged

(74) *Attorney, Agent, or Firm* — HP Inc. Patent Department

(57) ABSTRACT

A fabric coating composition can include water, from 3 wt % to 95 wt % oxazoline reactive compound by dry weight including an oxazoline group, and from 3 wt % to 70 wt % cationic charging agent by dry weight. The fabric coating composition can have a pH from pH 2 to pH 6.

12 Claims, 3 Drawing Sheets

(56) References Cited

U.S. PATENT DOCUMENTS

| | | | | |
|---|---|---|---|---|
| 2014/0308447 | A1 | 10/2014 | Sarkisian et al. | |
| 2017/0152333 | A1 | 6/2017 | Zorn et al. | |
| 2018/0094380 | A1 | 4/2018 | Yagi et al. | |
| 2018/0282567 | A1 | 10/2018 | Ishida | |
| 2022/0136170 | A1* | 5/2022 | Zhou | D06P 1/54 428/32.16 |

FOREIGN PATENT DOCUMENTS

| | | | | |
|---|---|---|---|---|
| EP | 1346840 | A1 * | 9/2003 | B41M 5/506 |
| EP | 2015939 | | 9/2011 | |
| JP | 2010131779 | A | 6/2010 | |
| JP | 2013095766 | A | 5/2013 | |
| KR | 100609935 | | 8/2006 | |
| WO | 2006096831 | | 9/2006 | |
| WO | WO-2017191660 | A1 | 11/2017 | |

* cited by examiner

FABRIC COATING COMPOSITIONS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new print media, for example.

DETAILED DESCRIPTION

Figure 1:
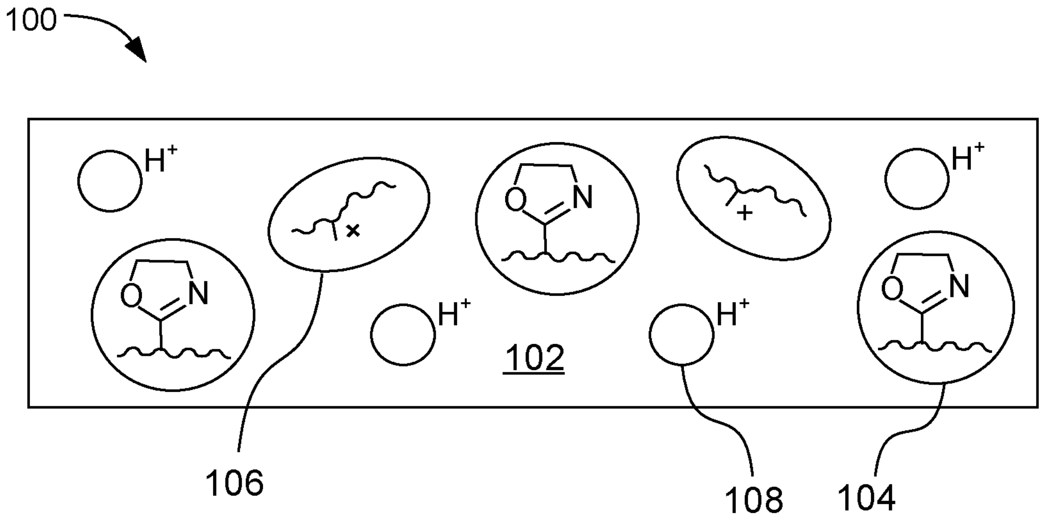
FIG. 1 schematically depicts an example fabric coating composition for coating print media substrates in accordance with the present disclosure.

The present disclosure is drawn to fabric coating compositions, coated fabric print media, and methods of printing on fabric. In accordance with this, an example fabric coating composition includes water, from 3 wt % to 95 wt % oxazoline reactive compound by dry weight including an oxazoline group, and from 3 wt % to 70 wt % cationic charging agent by dry weight. The fabric coating composition in this example has a pH from pH 2 to pH 6. In one example, the oxazoline reactive compound can be an oxazoline reactive polymer including from 1 millimole to 15 millimoles of oxazoline groups per gram of oxazoline reactive polymer. Furthermore, the oxazoline reactive polymer can have a weight average molecular weight from 1,000 Mw to 500,000 Mw. The cationic charging agent can include a cationic polymer having a weight average molecular weight of from 1,000 Mw to 50,000 Mw, and can be present in the fabric coating composition at from 5 wt % to 30 wt % by dry weight. The fabric coating composition can include an acidic pH control agent added to lower the pH of the fabric coating composition, such as to the range of pH 2 to pH 6 (the pH could start within this range and be lowered within this range, or it could be brought to within this range from above pH 6, for example). The acidic pH control agent can include, for example, sulfuric acid, nitric acid, phosphoric, hydrochloric acid, boric acid, acetic acid, lactic acid, formic acid, citric acid, oxalic acid, or a combination thereof. The fabric coating composition can further include a polymeric binder that is not reactive with the oxazoline reactive compound, or if reactive with the oxazoline reactive compound, is present at a concentration low enough to allow for the oxazoline reactive compound to retain a plurality of oxazoline groups available for crosslinking (or both). The cationic charging agent in one example can include a quaternary amine-containing polymer such as an epichlorohydrin amine polymer, a polydiallyldimethylammonium polymer, or a combination thereof.

In another example, a coated fabric print medium includes a fabric substrate, and a fabric coating layer on the fabric substrate having a 1 gsm to 10 gsm dry coating weight basis. The fabric coating layer in this example includes from 3 wt % to 85 wt % oxazoline reactive compound by dry weight, which indicates the presence of an oxazoline group(s) available for crosslinking. The fabric coating layer in this example also includes from 3 wt % to 70 wt % cationic charging agent. In one example, the coated fabric print medium can further include a polymer binder having a polymer structure or being present in the fabric coating layer at a concentration which permits a plurality of the oxazoline groups to remain unopened and available for crosslinking, e.g., when an ink composition such as a more basic pH ink composition is applied. In one example, the oxazoline reactive compound can be an oxazoline reactive polymer with from 5% to 95% of its polymerized monomeric units having an oxazoline group. The oxazoline reactive compound can be an oxazoline reactive polymer with multiple oxazoline groups, can have a weight average molecular weight from 1,000 Mw to 500,000 Mw, and may be present in the fabric coating layer at from 5 wt % to 85 wt % by dry weight, for example. The cationic charging agent can include, for example, a cationic polymer having a weight average molecular weight of from 1,000 Mw to 50,000 Mw, and the cationic polymer may be present in the fabric coating layer at from 5 wt % to 30 wt % by dry weight. The fabric substrate can include cotton, polyester, nylon, or a combination thereof.

In another example, a method of printing on fabric includes ejecting an ink composition having a pH from pH 7.5 to pH 12 onto a coated fabric print medium. The ink composition in this example includes a liquid vehicle with water and organic co-solvent as well as a pigment. The pigment or dispersant thereof includes a surface reactive group, or the ink composition further includes a polymer binder with a surface reactive group, or both may be the case. The surface reactive group includes, for example, a carboxylate, a phenol, or a thiophenol. The coated fabric print medium in this example includes a fabric substrate, and a fabric coating layer on the fabric substrate having a 1 gsm to 10 gsm dry coating weight basis. The fabric coating layer includes from 3 wt % to 85 wt % dry weight of an oxazoline reactive compound with an oxazoline group available for crosslinking, as well as from 3 wt % to 70 wt % dry weight of a cationic charging agent. The method, for example, further includes opening the oxazoline group to crosslink the oxazoline reactive compound with the surface reactive group of the ink composition at the coated fabric print medium. In one example, the oxazoline reactive compound may be present in the fabric coating layer at from 50 wt % to 85 wt % by dry weight and the cationic charging agent may be present in the fabric coating layer at from 5 wt % to 30 wt % by dry weight. In further detail, the oxazoline reactive compound can be an oxazoline reactive polymer including multiple oxazoline groups and having a weight average molecular weight from 1,000 Mw to 500,000 Mw. The cationic charging agent can be a cationic polymer having a weight average molecular weight of from 1,000 Mw to 50,000 Mw.

It is noted that when discussing the fabric coating compositions, the coated fabric print media, and/or the methods, these discussions can be considered applicable to one another whether or not they are explicitly discussed in the context of that specific example. Thus, for example, when discussing an oxazoline reactive compound related to the fabric coating compositions, such disclosure is also relevant to and directly supported in the context of the coated fabric print media and methods, and vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

The terms "coating" and "coated" are used herein to describe the coating composition, e.g., a fabric coating composition, or to describe a dried layer applied to a fabric substrate as a coating layer, e.g., a fabric coating layer. The dried layer can include some retained moisture, e.g., up to 10 wt %, up to 8 wt %, up to 6 wt %, up to 5 wt %, up to 4 wt %, etc. However, it is noted that the terms "coating" or "coated" may or may not indicate the presence of a layer of a composition applied on top of the fabric substrate as a discrete layer, but rather may instead be similar in nature to a surface treatment that may penetrate the fabric substrate surface and/or alter the surface chemistry of the fabric substrate. Thus, there may be some solids on top of the fabric substrate and others within the matrix of the fabric. Thus, the terms "coating" and "coated" should be interpreted to include compositions that modify the surface of the fabric substrate in some manner, either by a separate layer of material or by surface modification or treatment of the fabric substrate, etc.

Turning now to more specific detail regarding the fabric coating compositions, as shown in FIG. 1, an example fabric coating composition 100 can include an aqueous liquid vehicle 102, an oxazoline reactive compound 104, and a cationic charging agent 106. The pH of the fabric coating composition can be from pH 2 to pH 6, for example. To bring the pH to within this range, or to lower it further within this range, an acidic pH control agent 108 can be included in some examples. The oxazoline reactive compound and the cationic charging agent can be present in the fabric coating composition at a weight ratio of from 90:10, 70:30, 50:50, or 30:70, for example. The acidic pH control agent can be added to bring the pH of the fabric coating composition to a pH from pH 2 to pH 6, from pH 2.5, to pH 5.5, or from pH 3 to pH 5, for example. Chemical compounds that can provide a free hydrogen ion (H+) can be used to lower the pH of the coating composition and act as the pH control agent. Examples include, but are not limited to, sulfuric acid, nitric acid, phosphoric, hydrochloric acid, boric acid, acetic acid, lactic acid, formic acid, citric acid, oxalic acid, and/or the like.

Figure 2:
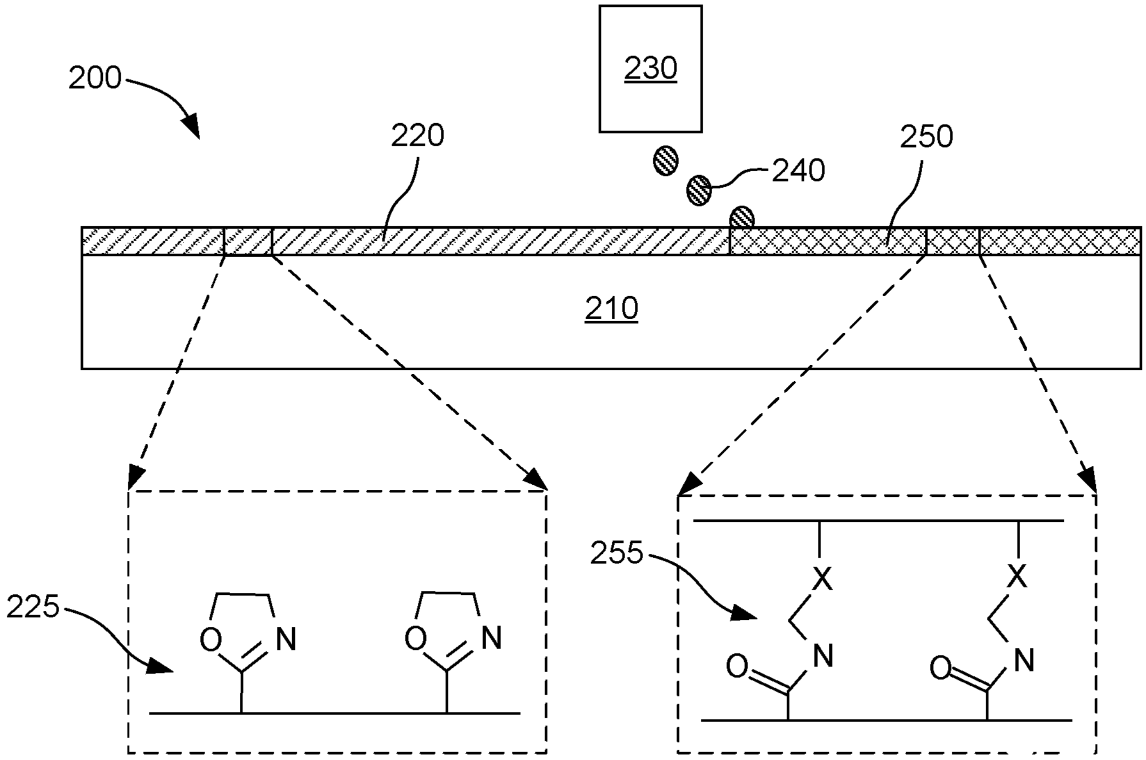
FIG. 2 schematically illustrates an example coated fabric print medium with an example crosslinking reaction introduced by application of an ink composition in accordance with the present disclosure.

FIG. 2 illustrates an example coated fabric print medium 200 with the fabric coating composition shown at 100 of FIG. 1 applied to a fabric substrate 210 and dried, leaving a fabric coating layer 220 thereon with an oxazoline reactive compound 225 contained therein in preparation for crosslinking. To illustrate an example use of the coated fabric print medium as shown in FIG. 2, an example ink composition 240 is shown being digitally ejected from a fluid ejector 230, such as a thermal inkjet pen or piezo inkjet pen, and onto the fabric substrate, and more specifically in contact with the fabric coating layer. If the ink includes any solids therein with a reactive surface group (shown at "X"), e.g., a carboxylate or carboxylic acid group, a phenol, a thiophenol, etc., then that surface reactive group may, under the right conditions, interact with the oxazoline groups (shown as the 5-membered heterocyclic aromatic rings appended to the oxazoline reactive compound) and promote crosslinking 255 between the opened oxazoline and the reactive surface group introduced with the ink composition. The reactive surface group may be present on a polymer binder, on pigment solids, on dispersants, or fabric surfaces, for example. By crosslinking the oxazoline reactive compound of the coated fabric print medium with a component of the ink composition, and in some examples further reacting with hydroxyl and/or carboxyl groups at a surface of the fabric, advantages can be realized such as enhanced wash durability and/or initial optical density (OD), among others.

Figure 3:
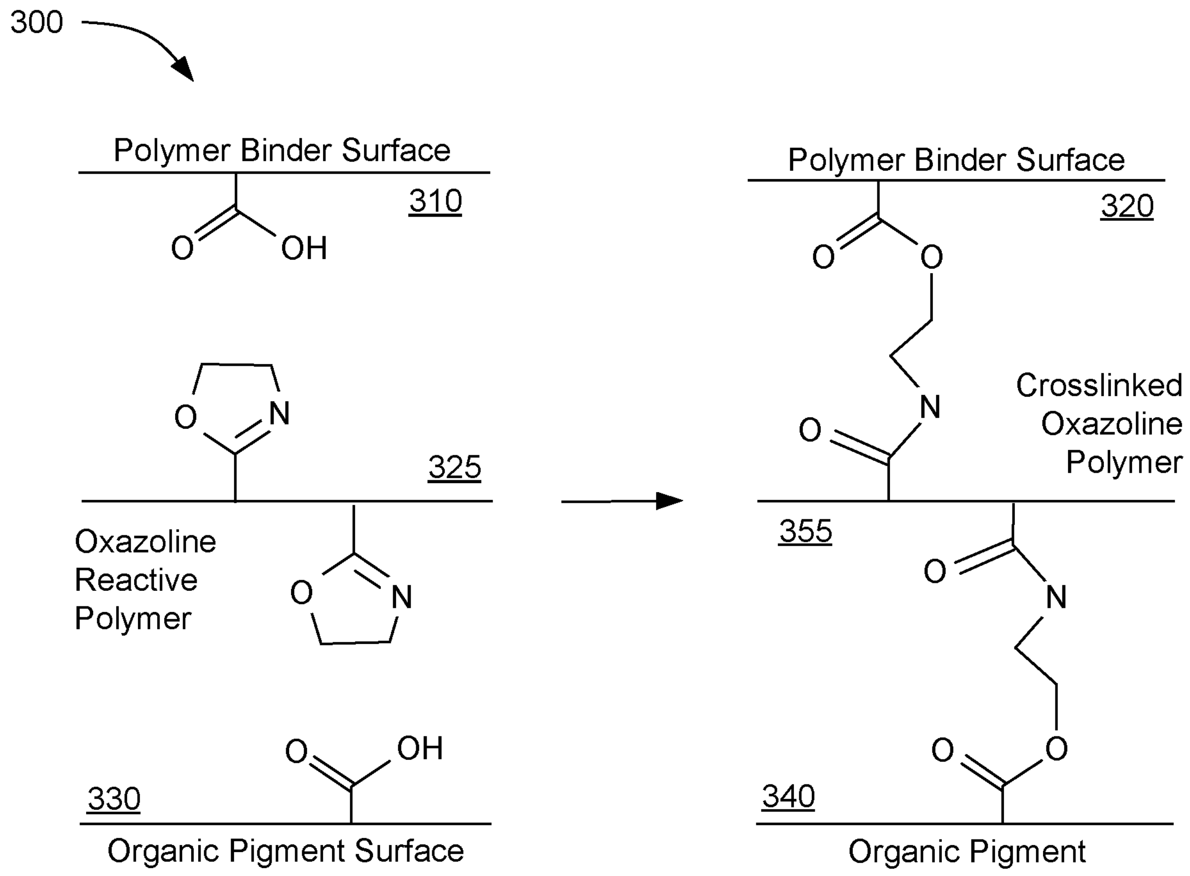
FIG. 3 schematically depicts an example reaction that may occur when the fabric coating composition is contacted with an ink composition that includes a pigment or a polymer binder with a carboxylated surface in accordance with the present disclosure.

FIG. 3 provides a more specific example of a crosslinking reaction 300 that can occur between an oxazoline reactive compound 325 of a fabric coating layer and a reactive surface group of various ink composition solids. Namely, a polymer binder with a carboxylated surface (carboxylic acid) is shown both before 310 and after 320 crosslinking with an oxazoline group of the oxazoline reactive compound. Furthermore, a pigment with a carboxylated surface (carboxylic acid) is shown both before 330 and after 340 crosslinking with an oxazoline group of the oxazoline reactive compound. After crosslinking, the oxazoline group is shown as an opened ring at 355, having reacted with the carboxylic acids to form a crosslinked structure. In this example, a carboxylic acid is shown as the reactive surface group, but as mentioned, other reactive surface groups could be present in the ink composition on various types of solids. However, in one example, there can be enhanced durability by using a polymer binder to crosslink with the oxazoline reactive compound. In this reaction, as shown in FIG. 1, after contact, a simple addition reaction can occur to form a crosslinked polymer network of polyacrylates. Since the oxazoline based cross-linkers may include several oxazoline groups, in one example, one oxazoline based cross-linker molecule can react with a surface carboxylate (or carboxylic acid residue) on different polymer chains tying them together forming a three-dimensional network (multiple polymer chains, polymer to pigment (as shown), etc.).

Figure 4:
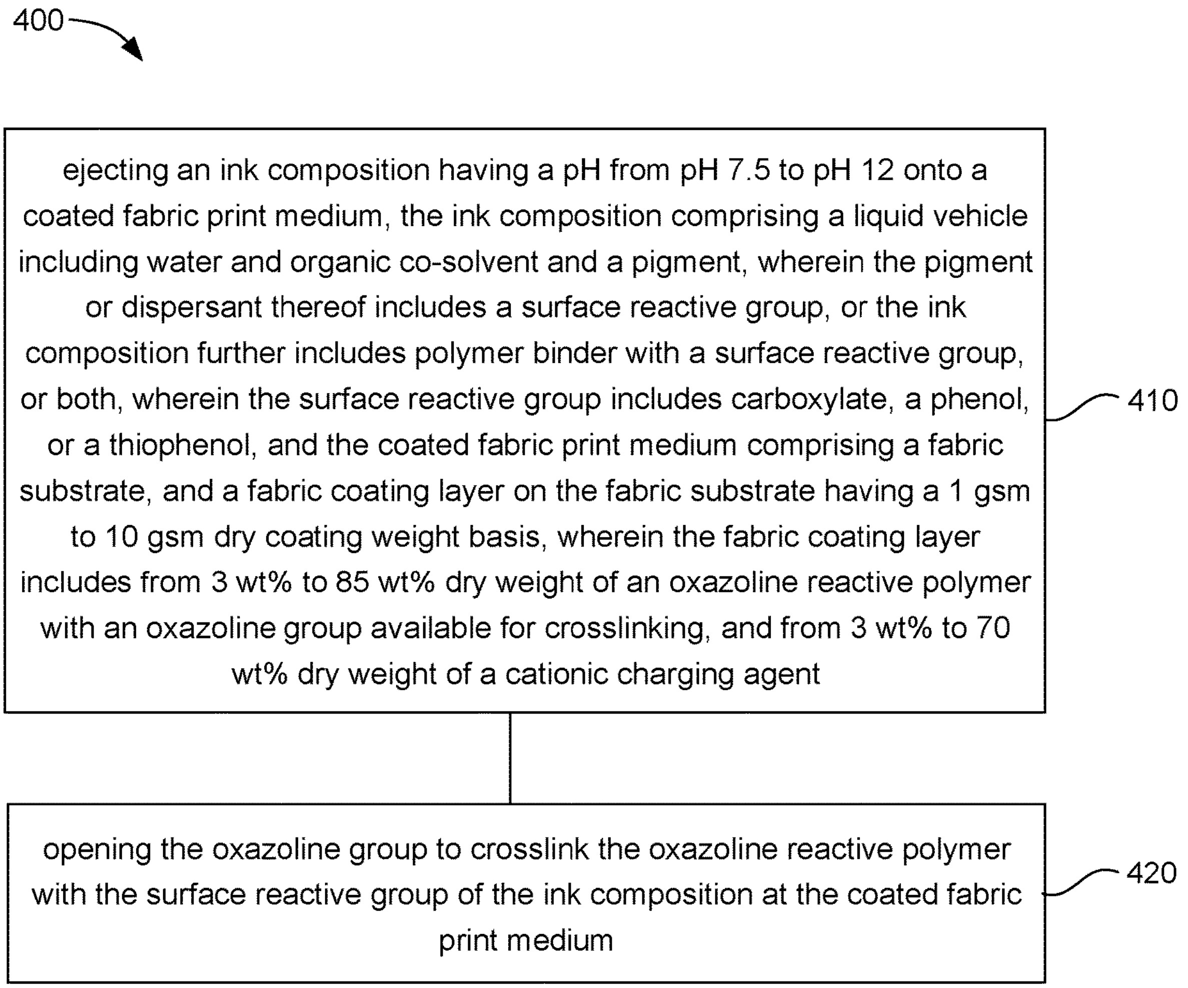
FIG. 4 provides a flow diagram of an example method printing on a fabric substrate in accordance with the present disclosure.

In another example, a method 400 of printing on a fabric substrate is shown in FIG. 4 as a flow diagram. The method in this example includes ejecting 410 an ink composition having a pH from pH 7.5 to pH 12 onto a coated fabric print medium. The ink composition in this example includes a liquid vehicle including water and organic co-solvent as well as a pigment. The pigment may include a surface reactive group, or the ink composition may further include a polymer binder with a surface reactive group (or both). The surface reactive group includes, for example, a carboxylate, a phenol, or a thiophenol. The coated fabric print medium in this example includes a fabric substrate, and a fabric coating layer on the fabric substrate having a 1 gsm to 10 gsm dry coating weight basis. In other examples, the coating weight basis can be from 1.5 gsm to 10 gsm, from 2 gsm to 10 gsm, from 1.5 gsm to 5 gsm, from 2 gsm to 8 gsm, or from 2 gsm to 5 gsm. The fabric coating layer can include from 3 wt % to 85 wt % dry weight of an oxazoline reactive compound with an oxazoline group available for crosslinking, as well as from 3 wt % to 70 wt % dry weight of a cationic charging agent. The method, for example, further includes opening 420 the oxazoline group to crosslink the oxazoline reactive compound with the surface reactive group of the ink composition at the coated fabric print medium. In one example, the oxazoline reactive compound may be present in the fabric coating layer at from 50 wt % to 85 wt % by dry weight and the cationic charging agent may be present in the fabric coating layer at from 5 wt % to 30 wt % by dry weight.

In one example, when the oxazoline compound used is an oxazoline reactive polymer, there may be from 1 mmol/g to 15 mmol/g, from 1 mmol/g to 10 mmol/g, or from 1.5 mmol/g to 10 mmol/g, based on non-volatiles. In other words, there may be from 1 millimole to 15 millimole of the oxazoline group (or one of the other subranges of oxazoline group) present on an oxazoline reactive polymer for every gram or dry (100 wt %) polymer. The cationic charging agent can be a cationic polymer having a weight average molecular weight of from 1,000 Mw to 50,000 Mw.

In these and other examples as shown in the FIGS., the oxazoline reactive compound can be used as a crosslinking polymer as an environmentally friendly alternative to other crosslinking polymers. For example oxazolines can be crosslinked and cured without the release of formaldehyde. In this regard, these polymers can be manufactured and used in compliance with some of the stricter governmental standards for products and goods. They can also be used without generating side products, and can be VOC-free in some examples. Additionally, oxazolines can crosslink carboxylic acid residue surfaces at relatively low temperatures, e.g., from 50° C. to 150° C., on textile substrates while still providing good initial print quality and wash durability. Oxazoline reactive compounds can also enhance chemical resistance in some instances, and can sometimes also improve hardness, abrasion, and scratch resistance. They react with carboxyl groups in relatively low temperature, with dosage as low as 3 wt %, or at much higher concentrations. Oxazoline reactive compounds can also have longer pot life than other types of polymers, and can also contribute to the dispersability of other components that may be present in the fabric coating compositions described herein.

The oxazoline reactive compound can be applied to fabric as part of a fabric coating composition, e.g., surface treatment solution, and then when a more basic fluid that includes components with carboxylic acid surface residues or other reactive surface groups is contacted therewith, crosslinking can occur. Three separate reaction schemes are shown below illustrating example ring-opening reactions that can occur with carboxylic acids, thiophenols, and phenols, as follows:

Formula I

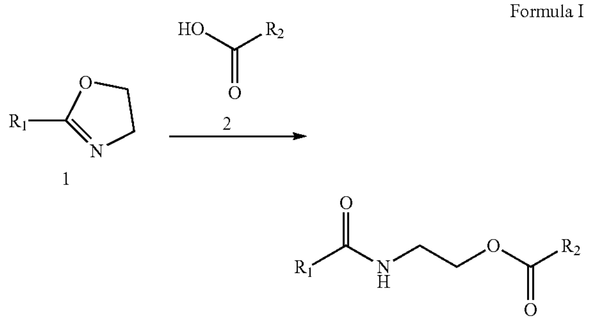

1 2 3

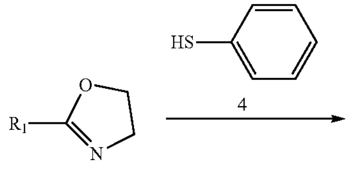

1 4

-continued

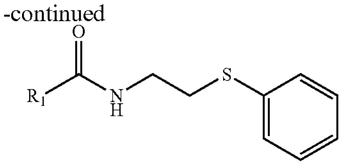

5

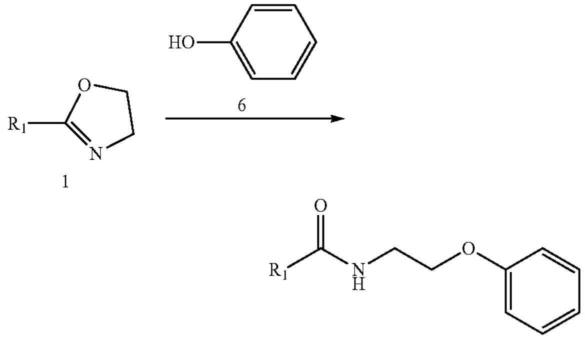

1 6 7

In the above reaction schemes, (1) is an oxazoline compound, (2) is a carboxylic acid residue, and (3) is a reaction product of the oxazoline compound and the carboxylic acid residue. Likewise (4) is a thiophenol and (5) is a reaction product of the oxazoline compound and the thiophenol. Furthermore, (6) is a phenol and (7) is a reaction product of the oxazoline compound and the phenol. In these reaction schemes, $R_1$ and $R_2$ can independently be any aromatic or aliphatic group, such as phenyl, substituted phenyl, linear alkyl, branched alkyl, etc. $R_1$ and/or $R_2$ can likewise be a polymer, for example.

Some general examples of oxazoline reactive compounds are provided below in Formulas II, III, and IV. Formula II represents an oxazoline-functionalized polystyrene, Formula III represents an oxazoline-functionalized polyacrylate, and Formula IV is an oxazoline-functionalized polystyrene polyacrylate. These Formulas are shown as follows:

Formula II

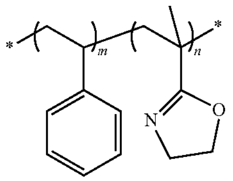

Formula III

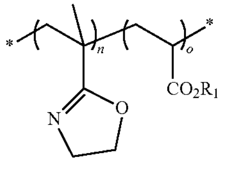

Formula IV

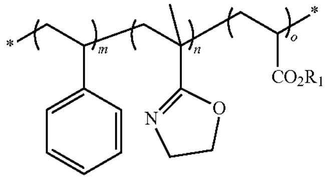

where m can be from 10 to 50,000; n can be from 10 to 50,000; and o can be from 10 to 50,000.

Oxazoline reactive compounds can be in the form of small molecules or polymers, and may have a weight average molecular weight of from 1,000 Mw to 500,000 Mw, from 1,000 Mw to 400,000 Mw, from 1,000 Mw to 300,000 Mw, from 2,000 Mw to 200,000 Mw, from 2,000 Mw to 50,000 Mw, from 5,000 Mw to 100,000 Mw, from 5,000 Mw to 50,000 Mw, from 5,000 Mw 40,000 Mw, from 5,000 Mw to 30,000 Mw, or from 5,000 Mw to 20,000 Mw, for example. Example oxazoline reactive polymers include oxazoline-containing latexes, such as those commercially available, including Epocros™ products from Nippon Shokubai, Japan such as Epocros® K-2010E, K-2020E, K-2030E, WS-300, WS-500, or WS-700. Carbodilite® SV 02, V-02, V-02-L2, or E-02.

Alternatively, in other examples, small molecular chemical compounds with oxazoline functional groups can also be used as the crosslinking agent and include, but are not limited to 2-ethyl-2-oxazoline, 2,4,4-trimethyl-2-oxazoline, 2-methyl-2-oxazoline, 2-(penta-4-ynyl)-2-oxazoline, 2-isopropenyl-2-oxazoline, 2-isopropyl-2-oxazoline, 2-n-propyl-2-oxazoline, 2-phenyl-2-oxazoline, 2-n-butyl-2-oxazoline, 4,4-dimethyl-2-phenyl-2-oxazoline, (4s,5s)-(−)-2-methyl-5-phenyl-2-oxazoline-4-methanol, 2,2'-isopropylidenebis [(4s)-4-tert-butyl-2-oxazoline], 2,2'-methylenebis[(4s)-4-tert-butyl-2-oxazoline], (s)-4-tert-butyl-2-[2-(diphenylphosphino)phenyl]-2-oxazoline, 2-(2-methoxyphenyl)-4,4-dimethyl-2-oxazoline, (r)-4-tert-butyl-2-[($s_p$)-2-(diphenylphosphino)ferrocenyl]-2-oxazoline, (s)-4-tert-butyl-2-[($s_p$)-2-(diphenylphosphino)ferrocenyl]-2-oxazoline, (−)-2,2'-isopropylidenebis[(4s)-4-phenyl-2-oxazoline], (+)-2,2'-isopropylidenebis[(4r)-4-phenyl-2-oxazoline], (+)-2,2'-isopropylidenebis[(4r)-4-benzyl-2-oxazoline, (r)-(+)-2-[2-(diphenylphosphino)phenyl]-4-isopropyl-2-oxazoline, 2,2'-methylenebis[(4r,5s)-4,5-diphenyl-2-oxazoline], 2,2'-methylenebis[(4s)-4-phenyl-2-oxazoline], 2,2'-bis[(4s)-4-benzyl-2-oxazoline], (r)-2-[($r_p$)-2-(diphenylphosphino)ferrocenyl]-4-isopropyl-2-oxazoline triphenylphosphine ruthenium(ii) chloride complex, (s)-(−)-2-[2-(diphenylphosphino)phenyl]-4-isopropyl-2-oxazoline, (s)-4-tert-butyl-2-(2-pyridyl)oxazoline, erythro-4-(1-hydroxy-2-hexadecenyl)-2-phenyl-2-oxazoline, (s)-2-[2-[bis (2-tolyl)phosphino]phenyl]-4-tert-butyl-2-oxazoline, (4s)-(+)-phenyl-α-[(4s)-phenyloxazolidin-2-ylidene]-2-oxazoline-2-acetonitrile, 4,4-dimethyl-2-oxazoline, 2-(4,5-dihydro-2-oxazolyl)quinolone, 2-[(45)-4,5-dihydro-4-(1-methylethyl)-2-oxazolyl]-n-{2-[(4,5)-4-(1,1-dimethylethyl)-4,5-dihydro-2-oxazolyl] phenyl}benzenamine, 2,6-bis[(4s)-(−)-isopropyl-2-oxazolin-2-yl]pyridine, 2,4-dimethyl-2-oxazoline-4-methanol, 2-propyl-2-oxazoline, (4s,5s)-(−)-2-ethyl-5-phenyl-2-oxazoline-4-methanol, 2-(4-bromobenzyl)-4,4-dimethyl-2-oxazoline, 2,6-bis[(4r)-(+)-isopropyl-2-oxazolin-2-yl]pyridine, n-((1s,2s)-1-((r)-4-isopropyl-4,5-dihydrooxazol-2-yl)-2-methylbutyl)acetamide, and n-((s)-1-((s)-4-benzyl-4,5-dihydrooxazol-2-yl)-2,2-dimethylpropyl) acetamide.

Turning now more specifically to the cationic charging agent described herein, this component can be used to generate pigment or other solids content fixation when an ink composition is printed on a coated fabric substrate in accordance with the present disclosure. The charging agent can be, for example, a metal salt such as a multivalent metal salt, or can be a cationic polymer. In the case of a metal salt, the cationic charging agent can be a salt including a Group II metal, a Group III metal, or a transition metal, such as calcium, copper, nickel, magnesium, zinc, barium, iron, aluminum, or chromium ions. The anion species can be chloride, iodide, bromide, nitrate, sulfate, sulfite, phosphate, chlorate, acetate ions, or various combinations. The metal salt can be selected from inorganic metal salts, such as calcium chloride, calcium nitrite, calcium sulfate, magnesium bromide, magnesium chloride, magnesium chlorate, magnesium sulfate, magnesium nitrate, magnesium perchlorate, magnesium fluorosilicate, aluminum sulfate, aluminum chloride, aluminum chloride, aluminum nitrate, aluminum chloride hydroxide ($Al_2Cl(OH)_5$), or the like. Alternatively, the metal salt can be selected from organic acid metal salts and its hydrates such as calcium acetate, calcium citrate, calcium acamprosate, calcium adipate, calcium benzoate, calcium formate, calcium isoascorbate, calcium malate, calcium propionate, calcium lactate, magnesium acetate, magnesium acetate tetrahydrate, magnesium aspartate tetrahydrate, trimagnesium dicitrate nonadydrate, trimagnesium dicitrate tetradecanehydrate, tricalcium dicitrate tetrahydrate, calcium actate tetrahydrate, magnesium stearate, magnesium alkylsalieylate, magnesium alkylphenolate, magnesium hydroxystearate, magnesium oleate, aluminum lactate, or the like.

Cationic polymer can be selected from naturally occurring polymer such as cationic gelatin, cationic dextran, cationic chitosan, cationic cellulose, or cationic cyclodextrin. The cationic polymer can also be a synthetically modified naturally occurring polymer such as a modified chitosan, e.g., carboxymethyl chitosan or N,N,N-trimethyl chitosan chloride. In one example, the cationic polymer may include polymer having ionic groups as part of the main chain, such as an alkoxylated quaternary polyamine. The polymer can have a weight average molecular weight ranging from 100 Mw to 8000 Mw, for example. The nitrogen atoms can be quaternized in some examples. In another example, the cationic polymer can be a polymer having ionic groups that append to an element of the backbone unit, such as quaternized poly(4-vinyl pyridine). Again, in this example, the above polymer can repeat to provide a polymer with a weight average molecular weight ranging from 100 Mw to 8000 Mw.

In yet another example, the cationic polymer can include polyamines and/or salts, polyacrylate diamines, quaternary ammonium salts, polyoxyethylenated amines, quaternized polyoxyethylenated amines, polydicyandiamides, polydiallyldimethyl ammonium chloride polymeric salts, or quaternized dimethylaminoethylacrylate or methacrylate polymers. In another example, the ionene polymer can include polyimines and/or salts thereof, such as linear polyethyleneimines, branched polyethyleneimines, or quatemized polyethylenimines. In another example, the ionene polymer can include a substitute polyurea such as poly[bis(2-chloroethyl) ether-alt-1,3 bis[3-(dimethylamino)propyl]urea], or quaternized poly[bis(2 chloroethyl)ether-alt-1,3-bis [3-(dimethylamino)propyl]. In another example, the ionene polymer can be a vinyl polymer and/or a salt thereof, such as quaternized vinylimidazol polymers, modified cationic vinylalcohol polymers, or alkylguanidine polymers.

In some examples, the fabric coating composition can include a polymer binder. The polymer binder can be included so that a plurality or even all of the oxazoline groups remain as ring structures, and thus available for crosslinking after an ink composition has been introduced. For example, the polymeric binder can be selected so that it is unreactive with the oxazoline reactive compound, particularly at the pH of the fabric coating composition or under conditions where the coating composition is dried to become a fabric coating layer, for example. Alternatively, if the polymer binder is reactive with the oxazoline reactive compound, it can be included at a concentration low enough to allow for the oxazoline reactive compound to retain a plurality of oxazoline groups available for crosslinking. In other words, if a polymer binder is added to the fabric coating composition, processing can occur, polymer can be selected, or concentrations can be considered to retain a plurality of oxazoline groups on the oxazoline reactive compound.

If a polymer binder is used, in some examples, the glass transition temperature (Tg) of the polymer binder can be from −40° C. to 0° C., for example. As there can be multiple molecular weights of polymer chains and/or even mixtures of different types of polymers, the term "glass transition temperature" or "Tg" means the temperature at which a majority by weight, e.g., greater than 50 wt %, of the polymer binders present in the composition exhibit transition as defined and measured by ASTM D6604. In this test, Standard Practice for Glass Transition Temperatures of Hydrocarbon Resins by Differential Scanning calorimetry can be used. Differential scanning calorimetry can be used to measure the heat capacity of the polymer across a range of temperatures. The heat capacity can jump over a range of temperatures around the glass transition temperature. The glass transition temperature itself can be defined as the temperature where the heat capacity is halfway between the initial heat capacity at the beginning of the jump and the final heat capacity at the end of the jump.

In some examples, the polymer binder can be a polyurethane; or a polyurethane derivative such as vinyl-urethane, acrylic urethane, polyurethane-acrylic, polyether polyurethane, polyester polyurethane, polycaprolactam polyurethane, polyether polyurethane, or a combination. In another example, the polyurethane or derivative can be formed by reacting an isocyanate with a polyol. Example isocyanates used to form the polyurethane polymer can include toluene di-isocyanate, 1,6-hexamethylenediisocyanate, diphenylmethanedi-isocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetra-isocyanate, triphenylmethane-tri-isocyanate, tris(isocyanate-phenyl) thiophosphate, and combinations thereof. Commercially available isocyanates can include Rhodocoat® WT 2102 (available from Rhodia AG), Basonat® LR 8878 (available from BASF), Desmodur® DA, and Bayhydur® 3100 (Desmodur® and Bayhydur® are available from Bayer AG). Example polyols used to form the polyurethane polymer can include 1,4-butanediol, 1,3-propanediol, 1,2-ethanediol, 1,2-propanediol, 1,6-hexanediol, 2-methyl-1,3-propanediol, 2,2-dimethyl-1,3-propanediol, neopentyl glycol, cyclo-hexane-dimethanol, 1,2,3-propanetriol, 2-ethyl-2-hydroxymethyl-1,3-propanediol, and combinations thereof.

In some examples, the isocyanate and the polyol can have less than three functional end groups per molecule. In another example, the isocyanate and the polyol can have less than five functional end groups per molecule. In yet another example, the polyurethane can be formed from a polyisocyanate having multiple isocyanate functionalities (—NCO) per molecule and one (or multiple) isocyanate reactive group (e.g., such as a polyol having two hydroxyl or amine groups or more than two of such groups). Example polyisocyanates can include diisocyanate monomers and oligomers. The self-crosslinked polyurethane polymer can also be formed by reacting an isocyanate with a polyol, where both isocyanates and polyols have an average of less than three end functional groups per molecule so that the polymeric network is based on a linear polymeric chain structure. In one example, the polyurethane can be prepared with a NCO/OH ratio ranging from 1.2 to 2.2. In another example, the polyurethane can be prepared with a NCO/OH ratio ranging from 1.4 to 2.0. In yet another example, the polyurethane can be prepared using an NCO/OH ratio ranging from 1.6 to 1.8.

In one example, the weight average molecular weight of the polyurethane polymer binder can range from 20,000 Mw to 200,000 Mw as measured by gel permeation chromatography. In another example, the weight average molecular weight of the polyurethane polymer binder can range from 40,000 Mw to 180,000 Mw as measured by gel permeation chromatography. In yet another example, the weight average molecular weight of the polyurethane polymer binder can range from 60,000 Mw to 140,000 Mw as measured by gel permeation chromatography.

The polyurethane may be aliphatic or aromatic. Some specific examples of commercially available aliphatic waterborne polyurethanes include Sancure® 1514, Sancure® 1591, Sancure® 2260, and Sancure® 2026 (all of which are available from Lubrizol Inc.). Some specific examples of commercially available castor oil-based polyurethanes include Alberdingkusa® CUR 69, Alberdingkusa® CUR 99, and Alberdingkusa® CUR 991 (all from Alberdingk Boley Inc.).

Other examples of the polyurethane polymer binder that can be used include vinyl-urethane, acrylic urethane, polyurethane-acrylic, polyether polyurethane, polyester polyurethane, polycaprolactam polyurethane, or polyether polyurethane. Any of these examples may be aliphatic or aromatic. For example, the polyurethane may include aromatic polyether polyurethanes, aliphatic polyether polyurethanes, aromatic polyester polyurethanes, aliphatic polyester polyurethanes, aromatic polycaprolactam polyurethanes, or aliphatic polycaprolactam polyurethanes.

In some examples, the polymer binder that can be used may include vinyl-urethane, acrylic urethane, polyurethane-acrylic and is formed by using vinyl-urethane hybrid copolymers or acrylic-urethane hybrid copolymers. In yet some other examples, the polymeric network(s) includes an aliphatic polyurethane-acrylic hybrid polymer. Representative commercially available examples of the chemicals which can form an acrylic-urethane polymeric network include NeoPac®R-9000, R-9699 and R-9030 (from Zeneca Resins) or HYRBIDUR™ 570 (from Air Products and Chemicals). In still another example, the polymeric network includes an acrylic-polyester-polyurethane polymer, such as Sancure® AU 4010 (from Lubrizol Inc.).

In some examples, any example of the polymer binder can include a polyether polyurethane. Representative commercially available examples of the chemicals which can form a polyether-urethane polymeric network include Alberdingkusa® U 205, Alberdingkusa® U 410, and Alberdingkusa® U 400N (all from Alberdingk Boley Inc.), or Sancure®861, Sancure® 878, Sancure® 2310, Sancure® 2710, Sancure® 2715, or Avalure® UR445 (equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer" (all from Lubrizol Inc.).

In other examples, any example of the polymer binder can include a polyester polyurethane. Representative commercially available examples of the chemicals which can form a polyester-urethane polymeric network include Alberdingkusa® 801, Alberdingkusa® u 910, Alberdingkusa® u 9380, Alberdingk® u 2101 and Alberdingk® u 420 (all from Alberdingk Boley Inc.), or Sancure® 815, Sancure® 825, Sancure® 835, Sancure® 843c, Sancure® 898, Sancure® 899, Sancure® 1301, Sancure® 1511, Sancure® 2026c, Sancure® 2255, and Sancure® 2310 (all from Lubrizol, Inc.). In still other examples, any example of the polymer binder can include a polycarbonate polyurethane. Examples of polycarbonate polyurethanes include Alberdingkusa® U 933 and Alberdingkusa® U 915 (all from Alberdingk Boley Inc.).

In some examples, the polymer binder can include a rubber emulsion/latex. The types of rubber emulsion/latex include, but are not limited to, natural Rubber (NR) or linear polymer of polyisoprene, Styrene Butadiene Rubber (SBR), Nitrile Rubber or copolymer of acrylonitrile and butadiene, Neoprene Rubber or polychloroprene, EPDM Rubber or copolymer of ethylene, propylene with dienes such as dicyclopentadiene (DCPD), ethylidene norbornene (ENB), and vinyl norbornene (VNB), Butyl Rubber (BR), or copolymer of isobutylene with isoprene, polychloroprene rubber, polysiloxane rubber and chloro-sulphonated polyethylene/rubber.

In one example, the polymer binders can include a polyacrylate, e.g., a polyacrylate based polymer. Examples of polyacrylates include polymers made by hydrophobic addition monomers, such as C1-C12 alkyl acrylates, carboxylic containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate, etc.), vinyl benzene monomer, C1-C12 alkyl acrylamide and methacrylamide (e.g., t-butyl acrylamide, sec-butyl acrylamide, N,N-dimethylacrylamide, etc.), crosslinking monomers (e.g., divinyl benzene, ethylene glycol dimethacrylate, bis(acryloylamido)methylene, etc.), and combinations thereof. As specific examples, polymers made from the polymerization and/or copolymerization of alkyl acrylate, alkyl methacrylate, and/or vinyl esters may be used. Any of the listed monomers (e.g., hydrophobic addition monomers, aromatic monomers, etc.) may be copolymerized with styrene or a styrene derivative. As specific examples, polymers made from the copolymerization of alkyl acrylate, alkyl methacrylate, and/or vinyl esters, with styrene or styrene derivatives may also be useful.

The fabric coating compositions of the present disclosure can be applied to fabric substrates to form fabric coating layers. Any methodology can be used, including any of a number of analog coating processes. In some examples, a variety of spray coating methods may be used with the present embodiment. In one example, the fabric substrate is passed under an adjustable spray nozzle. The adjustable spray nozzle may be configured to alter the rate at which the pre-treatment solution is sprayed onto the fabric substrate. By adjusting factors such as the rate at which the fabric substrate is passed under the nozzle, the rate at which the composite solution is sprayed on the base paper, the distance of the fabric substrate from the nozzle, the spraying profile of the nozzle, and the concentration of the pre-treatment solution, a layer of pre-treatment composition with desired attributes may be deposited on the fabric substrate.

The application can be carried out using padding procedures. The fabric substrate can be soaked in a bath and the excess can be rolled out. More specifically, impregnated fabric substrates (prepared by bath, spraying, dipping, etc.) can be passed through padding nip rolls under pressure. The impregnated fabric, after nip rolling, can then be dried under heat at any functional time which is controlled by machine speed with peak fabric web temperature. In some examples, pressure can be applied to the fabric substrate after impregnating the fabric base substrate with the pre-treatment composition. In some other examples, the surface treatment is accomplished in a pressure padding operation. During such operation, the fabric base substrate is firstly dipped into a pan containing a treatment coating composition and is then passed through the gap of padding rolls. The padding rolls (a pair of two soft rubber rolls or a metal chromic hard roll and a tough-rubber synthetic soft roll for instance), apply the pressure to composite-wetted textile material so that composite amount can be accurately controlled. In some examples, the pressure applied can be from 10 psi to 150 psi, or in some other examples, can be from 30 psi to 70 psi.

Regardless of how the fabric coating composition is applied, in some examples, the coating composition can be dried using a box hot air dryer. The dryer can be a single unit or could be in a series of 3 to 7 units so that a temperature profile can be created with initial higher temperature (to remove excessive water) and mild temperature in end units (to ensure completely drying with a final moisture level of less than 1-5% for example). The peak dryer temperature can be programmed into a profile with higher temperature at the beginning of the drying when wet moisture is high and reduced to lower temperature when web is becoming dry. The dryer temperature can be controlled to a temperature of less than 100° C. In some examples, the operation speed of the padding/drying line is 50 yards per minute.

Drying can be carried out to remove aqueous liquid vehicle components, including water, for example. Some water may remain in "dried" fabric coating layers. For example, the fabric coating layer can retain up to 10 wt % moisture content, up to 8 wt % moisture content, up to 6 wt % moisture content, up to 5 wt % moisture content, up to 4 wt % moisture content, etc. When drying, retaining the reactivity of the oxazoline groups can be considered, and in some instances, monitored by a differential scanning calorimeter (DSC) and/or by following protocols established for this purpose, e.g., controlling processing temperature. In one example, the drying temperature can be from 50° C. to 150° C., and in another example, from 80° C. to 100° C.

The fabric substrates described herein can be treated with the fabric coating compositions of the present disclosure. Example fabric substrates include treated and untreated cotton substrates, polyester substrates, nylons, silk, blended substrates thereof, etc. It is notable that the term "fabric substrate" or "fabric media substrate" does not include materials such as any paper (even though paper can include multiple types of natural and synthetic fibers or mixtures of both types of fibers). Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources such as cornstarch, tapioca products, or sugarcanes, etc. Example synthetic fibers that can be used include polymeric fibers such as nylon fibers (also referred to as polyamide fibers), polyvinyl chloride (PVC) fibers, PVC-free fibers made of polyester, polyamide, polyimide, polyacrylic, polypropylene, polyethylene, polyurethane, polystyrene, polyaramid, e.g., Kevlar® (E. I. du Pont de Nemours Company, USA), polytetrafluoroethylene, fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both of the polymeric fiber and a surface of the fabric, a plasma treatment, a solvent treatment, acid etching, or a biological treatment, an enzyme treatment, or an antimicrobial treatment to prevent biological degradation.

Thus, the fabric substrate can include natural fiber and synthetic fiber, e.g., cotton/polyester blend. The amount of the various individual fiber types can vary. For example, the amount of the natural fiber can vary from 5 wt % to 95 wt % and the amount of synthetic fiber can range from 5 wt % to 95 wt %. In yet another example, the amount of the natural fiber can vary from 10 wt % to 80 wt % and the synthetic fiber can be present from 20 wt % to 90 wt %. In other examples, the amount of the natural fiber can be from 10 wt % to 90 wt % and the amount of synthetic fiber can also be from 10 wt % to 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa. The fabric substrate can be in one of many different forms, including, for example, a textile, a cloth, a fabric material, fabric clothing, or other fabric product suitable for applying ink, and the fabric substrate can have any of a number of fabric structures, including structures that can have warp and weft, and/or can be woven, non-woven, knitted, tufted, crocheted, knotted, and pressured, for example. The terms "warp" as used herein, refers to lengthwise or longitudinal yarns on a loom, while "weft" refers to crosswise or transverse yarns on a loom.

The fabric substrate can have a basis weight ranging from 10 grams per square meter (gsm) to 500 gsm. In another example, the fabric substrate can have a basis weight ranging from 50 gsm to 400 gsm. In other examples, the fabric substrate can have a basis weight ranging from 100 gsm to 300 gsm, from 75 gsm to 250 gsm, from 125 gsm to 300 gsm, or from 150 gsm to 350 gsm.

In addition, the fabric substrate can contain additives including, but not limited to, colorant (e.g., pigments, dyes, and tints), antistatic agents, brightening agents, nucleating agents, antioxidants, UV stabilizers, and/or fillers and lubricants, for example. Alternatively, the fabric substrate may be pre-treated in a solution containing the substances listed above before applying other treatments or coating layers.

Regardless of the substrate, whether natural, synthetic, blend thereof, treated, untreated, etc., the fabric substrates printed with the ink composition of the present disclosure can provide acceptable optical density (OD) and/or washfastness properties. The term "washfastness" can be defined as the OD that is retained or delta E (ΔE) after five (5) standard washing machine cycles using warm water and a standard clothing detergent (e.g., Tide® available from Proctor and Gamble, Cincinnati, OH, USA). By measuring OD and/or L*a*b* both before and after washing, ΔOD and ΔE values can be determined, which can be a quantitative way of expressing the difference between the OD and/or L*a*b*prior to and after undergoing the washing cycles. Thus, the lower the ΔOD and ΔE values, the better. In further detail, ΔE is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the ΔE value calculated based on subtracting the pre-washing color values of L*, a*, and b* from the post-washing color values of L*, a*, and b*. Those values can then be squared, and then a square root of the sum can be determined to arrive at the ΔE value. The 1976 standard can be referred to herein as "$\Delta E_{CIE}$." The CIE definition was modified in 1994 to address some perceptual non-uniformities, retaining the L*a*b* color space, but modified to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the problematic blue region at hue angles of about)275°), ii) compensation for neutral colors or the primed values in the L*C*h differences, iii) compensation for lightness ($S_L$, iv) compensation for chroma ($S_C$), and v) compensation for hue ($S_H$). The 2000 modification can be referred to herein as "$\Delta E_{2000}$." In accordance with examples of the present disclosure, ΔE value can be determined using the CIE definition established in 1976, 1994, and 2000 to demonstrate washfastness.

In further detail regarding the ink composition briefly mentioned in connection with FIGS. 2 and 3, the ink composition can include an aqueous liquid vehicle and a colorant, such as a pigment and/or a dye. In one example, the colorant can a pigment. In another example, the colorant can be a pigment with surface reactive groups (to react and crosslink with oxazoline groups in the fabric coating layer). In some examples, the pigment can be present in an amount from 0.5 wt % to 12 wt %, from 0.5 wt % to 10 wt %, from 1 wt % to 8 wt %, or from 2 wt % to 6 wt % in the ink composition. The pigment in the ink composition can be self-dispersed with a polymer, oligomer, or small molecule; or can be dispersed with a separate dispersant. Furthermore, the pigment can be any of a number of pigments of any of a number of primary or secondary colors, or can be black or white, for example. More specifically, colors can include cyan, magenta, yellow, red, blue, violet, red, orange, green, etc. In one example, the ink composition can be a black ink with a carbon black pigment. In another example, the ink composition can be a cyan or green ink with a copper phthalocyanine pigment, e.g., Pigment Blue 15:0, Pigment Blue 15:1; Pigment Blue 15:3, Pigment Blue 15:4, Pigment Green 7, Pigment Green 36, etc. In another example, the ink composition can be a magenta ink with a quinacridone pigment or a co-crystal of quinacridone pigments. Example quinacridone pigments that can be utilized can include PR122, PR192, PR202, PR206, PR207, PR209, P048, P049, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., PY74 and PY155. Other examples of pigments include the following, which are available from BASF Corp.: Paliogen® Orange, Heliogen® Blue L 6901F, Heliogen® Blue NBD 7010, Heliogen® Blue K 7090, Heliogen® Blue L 7101F, Heliogen® Blue L 6470, Heliogen® Green K 8683, Heliogen® Green L 9140, Chromophtal® Yellow 3G, Chromophtal® Yellow GR, Chromophtal® Yellow 8G, Igrazin® Yellow 5GT, and Igralite® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: Regal® 400R, Regal® 330R, Regal® 660R, Mogul® L, Black Pearls® L, MONARCH® 1400, Monarch® 1300, Monarch® 1100, Monarch® 1000, Monarch® 900, Monarch® 880, Monarch® 800, and Monarch® 700. The following pigments are available from Orion Engineered Carbons GMBH: Printex® U, Printex® V, Printex® 140U, Printex® 140V, Printex® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: Monastral® Magenta, Monastral® Scarlet, Monastral® Violet R, Monastral® Red B, and Monastral® Violet Maroon B. The following pigments are available from Clariant: Dalamar® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Sun Chemical: Quindo® Magenta, Indofast® Brilliant Scarlet, Quindo® Red R6700, Quindo® Red R6713, Indofast® Violet, L74-1357 Yellow, L75-1331 Yellow, L75-2577 Yellow, and LHD9303 Black. The following pigments are available from Birla Carbon: Raven® 7000, Raven® 5750, Raven® 5250, Raven® 5000 Ultra® II, RAVEN® 2000, Raven® 1500, Raven® 1250, Raven® 1200, Raven® 1190 Ultra®, Raven® 1170, Raven® 1255, Raven® 1080, and Raven® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific other examples of a cyan color pigment may include C.I. Pigment Blue-1, -2, -3, -15, -15:1, -15:2, -15:3, -15:4, -16, -22, and -60; magenta color pigment may include C.I. Pigment Red-5, -7, -12, -48, -48:1, -57, -112, -122, -123, -146, -168, -177, -184, -202, and C.I. Pigment Violet-19; yellow pigment may include C.I. Pigment Yellow-1, -2, -3, -12, -13, -14, -16, -17, -73, -74, -75, -83, -93, -95, -97, -98, -114, -128, -129, -138, -151, -154, and -180. Black pigment may include carbon black pigment or organic black pigment such as aniline black, e.g., C.I. Pigment Black 1. While several examples have been given herein, it is to be understood that any other pigment can be used that is useful in color modification, or dye may even be used in addition to the pigment.

Furthermore, pigments and dispersants are described separately herein, but there are pigments that are commercially available which include both the pigment and a dispersant suitable for ink composition formulation. Specific examples of pigment dispersions that can be used, which include both pigment solids and dispersant are provided by example, as follows: HPC-K048 carbon black dispersion from DIC Corporation (Japan), HSKBPG-11-CF carbon black dispersion from Dom Pedro (USA), HPC-0070 cyan pigment dispersion from DIC, Cabojet® 250C cyan pigment dispersion from Cabot Corporation (USA), 17-SE-126 cyan pigment dispersion from Dom Pedro, HPF-M046 magenta pigment dispersion from DIC, Cabojet® 265M magenta pigment dispersion from Cabot, HPJ-Y001 yellow pigment dispersion from DIC, 16-SE-96 yellow pigment dispersion from Dom Pedro, or Emacol SF Yellow AE2060F yellow pigment dispersion from Sanyo (Japan).

Thus, the pigment(s) can be dispersed by a dispersant that is adsorbed or ionically attracted to a surface of the pigment, or can be covalently attached to a surface of the pigment as a self-dispersed pigment. In one example, the dispersant can be an acrylic dispersant, such as a styrene acrylate or methacrylate dispersant, or other dispersant suitable for keeping the pigment suspended in the liquid vehicle. In one example, the styrene acrylate or methacrylate dispersant can be used, as it can promote Π-stacking between the aromatic ring of the dispersant and various types of pigments. In one example, the styrene acrylate or methacrylate dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene acrylate or methacrylate dispersant can have an acid number from 100 to 350, from 120 to 350, from 150 to 300, from 180 to 250, for example. Example commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

In addition to the pigment, a polymer binder can be present, and in some examples, the polymer binder can include a reactive surface group, as described previously, for purposes of reacting with oxazoline groups of the fabric coating layer. For example, the polymer can include an acrylic latex polymer with surface carboxylate or carboxylic acid groups, or another dispersed polymer binder with phenol or thiophenol groups that, under the right conditions, interact with oxazoline groups (shown as the 5-membered heterocyclic aromatic rings appended to the oxazoline reactive compound) and promote crosslinking between the opened oxazoline and the reactive surface group introduced as a polymer binder with the ink composition. By crosslinking the oxazoline reactive compound of the coated fabric print medium with a component of the ink composition, advantages can be realized such as enhanced wash durability and/or initial optical density (OD), among others. Example polymer binders with reactive surface groups that can be used include, for example, latex polymer including acrylic latex polymer, polyurethane or a polyurethane derivative such as those described previously herein for use in the fabric coating composition, hybrid latex-polyurethane polymers, etc. Any of these polymers or others, as prepared to include a reactive surface group, can be used in accordance with the present disclosure.

The aqueous liquid vehicle can include water and an organic co-solvent. In a further example, the organic co-solvent can be present in an amount from 4 wt % to 49 wt %, or from 8 wt % to 25 wt % with respect to the total weight of the ink. In a still further example, the organic co-solvent can be present in an amount from 10 wt % to 15 wt %. In a particular example, the organic co-solvent can be 1,2-butanediol. In other examples, the organic co-solvent can include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol, 2,2-diethyl-1,3-propanediol, glycerin, trimethylolpropane, pentaerythritol, and the like.

In certain examples, the ink composition can include a surfactant or a mixture of surfactants in a total amount from 0.05 wt % to 15 wt %, from 0.1 wt % to 10 wt %, from 0.3 wt % to 8 wt %, or from 0.5 wt % to 1.5 wt % with respect to the total weight of the ink. Suitable surfactants can include anionic, cationic, amphoteric and nonionic surfactants. Commercially-available surfactants or dispersants include the TAMOL™ series from Dow Chemical Co., nonyl and octyl phenol ethoxylates from Dow Chemical Co. (e.g., Triton™ X-45, Triton™ X-100, Triton™ X-114, Triton™ X-165, Triton™ X-305 and Triton™ X-405) and other suppliers (e.g., the T-DET™ N series from Harcros Chemicals), alkyl phenol ethoxylate (APE) replacements from Dow Chemical Co., Elementis Specialties, and others, various members of the Surfynol® series from Air Products and Chemicals, (e.g., Surfynol® 104, Surfynol® 104A, Surfynol® 104BC, Surfynol® 104DPM, Surfynol® 104E, Surfynol® 104H, Surfynol® 104PA, Surfynol® 104PG50, Surfynol® 104S, Surfynol® 2502, Surfynol® 420, Surfynol® 440, Surfynol® 465, Surfynol® 485, Surfynol® 485W, Surfynol® 82, Surfynol® CT-211, Surfynol® CT-221, Surfynol® OP-340, Surfynol® PSA204, Surfynol® PSA216, Surfynol® PSA336, Surfynol® SE and Surfynol® SE-F), Capstone® FS-35 from DuPont, various fluorocarbon surfactants from 3M, E.I. DuPont, and other suppliers, and phosphate esters from Ashland, Rhodia and other suppliers. Dynwet® 800, for example, from BYK-chemie, Gmbh (Germany), can also be used.

Various other additives can be included to provide desirable printability, shelf-life, image quality, etc., properties to the ink composition. Examples of these additives are those added to inhibit the growth of harmful microorganisms. These additives may be biocides, fungicides, and other microbial agents. Examples of suitable microbial agents include, but are not limited to, Nuosept® (Nudex, Inc.), Ucarcide™ (Union carbide Corp.), Vancide® (R. T. Vanderbilt Co.), Proxel® (ICI America), or a combination thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used if present. Viscosity modifiers and buffers may also be present, as well as other additives to modify properties of the ink as desired. Such additives can be present at from 0.01 wt % to 20 wt % if present.

Anti-kogation agents can also be included in the ink composition. In some examples, anti-kogation agents can be included in an amount of 0.1 wt % to 10 wt % with respect to the total weight of the ink. In other examples, the anti-kogation agents can be included in an amount of 0.1 wt % to 3 wt %. Examples of anti-kogation agents include surfactants of the Crodafos® family available from Croda Inc. (Great Britain), such as Crodafos® N3A, Crodafos® N3E, Crodafos® CA10A, Crodafos® HCE and Crodafos® SG. Other examples include Arlatone® Map 950 available from Croda Inc.; Monofax® 831, Monofax® 1214 available from Mona Industries; Monalube® 215 and Atlox® DP13/6 available from Croda Inc.; and Liponic® EG-1 (LEG-1) available from Lipo Chemicals (USA).

In further detail, and in accordance with the examples herein, the fabric coating layer printed with an ink composition, such as an ink composition including a component(s) with a surface reactive group (relative to the oxazoline groups in the fabric coating layer) can partially crosslink in some instances upon contact, but in other instances, coated fabric media with ink thereon can be post cured using a heating device, such as heated calendaring roller(s), a hot air chamber, an infrared light(s), e.g., IR/LED, a heat press, and/or the like. The heating temperature and heating time can vary, depending on the device used. In one example, heating can be carried out at from 100° C. to 200° C., from 120° C. to 180° C., or from 140° C. to 160° C. Heating times can be, for example, from 3 seconds to 120 seconds, 5 seconds to 60 seconds, or from 10 seconds to 30 seconds. Times and temperatures within these ranges, or even outside of these guidance ranges can be dependent on the specific coating composition layer formulation, layer thickness, fabric substrate selected, and/or other factors.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, "liquid vehicle" or "ink vehicle" refers to a liquid fluid in which colorant, such as pigments, and in some instances other solids, such as polymer binder, can be dispersed and otherwise placed to form an ink composition. A wide variety of liquid vehicles may be used with the systems and methods of the present disclosure. Such liquid vehicles may include a mixture of a variety of different agents, including, water, organic co-solvents, surfactants, anti-kogation agents, buffers, biocides, sequestering agents, viscosity modifiers, surface-active agents, water, etc.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if the numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is merely illustrative of the methods and systems herein. Numerous modifications and alternative methods and systems may be devised without departing from the present disclosure. Thus, while the technology has been described above with particularity, the following provides further detail in connection with what are presently deemed to be the acceptable examples.

Example 1

Preparation of Fabric Coating Composition

Two fabric coating compositions were prepared in accordance with Table 1, as follows:

TABLE 1

| Ingredient | Category | Coating 1 (wt %) | Coating 2 (wt %) |
|---|---|---|---|
| Epocros ® WS-300 Oxazoline | Oxazoline Reactive Compound | 88.4 | 88.4 |
| Floquat ™ 4820 (ammonium salt-based cationic polymer) | Charging Agent | 11 | 11 |
| Dynwet ® 800 | Surfactant | 0.55 | 0.55 |
| HCl | pH Control Agent | Add until with range of pH 2 to pH 6 | None Added pH 7.5 |

Epocros ® WS-300 is from Nippon Shokubai (Japan).
Floquat ™ is from SNF, Inc., (France).
Dynwet ® is from BYK-chemie, Gmbh (Germany).

Example 2

Preparation of Coated and Uncoated Fabric Substrates for Comparison

Several fabric substrate samples were collected, and a portion of those were coated with Coating 1 (at pH 4.5) or Coating 2 (at pH 7.5) of Table 1. Table 2, as follows, shows the various samples prepared:

TABLE 2

| Sample ID | Coating ID | pH | Fabric Type |
|---|---|---|---|
| 1A | None | N/A | Cotton |
| 1B | None | N/A | 50/50 (w/w) Cotton Polyester Blend |
| 1C | None | N/A | Nylon |
| 2A | Coating 1 | 4.5 | Cotton |
| 2B | Coating 1 | 4.5 | 50/50 (w/w) Cotton Polyester Blend |
| 2C | Coating 1 | 4.5 | Nylon |
| 3A | Coating 2 | 7.5 | Cotton |
| 3B | Coating 2 | 7.5 | 50/50 (w/w) Cotton Polyester Blend |
| 3C | Coating 2 | 7.5 | Nylon |

These formulations were applied to these substrates at a weight basis of 2 grams per square meter (gsm).

Example 3

Preparation of Ink Compositions

Cyan and Black inks were prepared in accordance with the ink formulation shown in Table 3, as follows:

TABLE 3

| Ingredient | Category | Cyan (C) Ink (wt %) | Black (K) Ink (wt %) |
|---|---|---|---|
| Impranil ® DLN-SD | Polyurethane Binder | 6 | 6 |
| Glycerol | Organic Co-solvent | 6 | 6 |
| Crodafos ® N3 acid | Surfactant | 0.5 | 0.5 |
| LEG-1 | Organic Cosolvent | 1 | 1 |
| Acticide ® B20 | Biocide | 0.22 | 0.22 |
| Surfynol ® 440 | Surfactant | 0.3 | 0.3 |
| Pigment | Colorant | 3 | 2.5 |

Example 4

Washfastness Durability

The Cyan and Black Inks of Table 3 were used to generate prints on gray cotton, 50/50 cotton/polyester blend, and nylon substrates, both without a coating composition applied, as well as on fabric samples with Coating 1 or Coating 2. In other words, all of the fabric substrates outlined in Table 2 and identified as Sample IDs 1A-3C were used in the study. The various printed fabrics were printed using an HP A3410 inkjet pen to generate durability plots having an ink density of 3 dots per pixel. The various samples were then cured at 150° C. for 3 minutes. Wash durability protocols were followed to determine which samples had the best washfastness durability. The durability protocols were based on 5 washing machine cycles using a conventional washer at 40° C. with and a standard amount of washing machine detergent as directed on the detergent packaging, e.g., Tide®. Air drying of the printed samples occurred between individual wash cycles. Optical Density (OD) and LAB Color Space data was collected from the durability plots, and initial OD data as well as a change gamut after 5 wash cycles is reported in Table 4 below. With respect to OD, the higher the value, the higher the optical density value. ΔE is defined previously, and in relation to this, the data collected is based on the $\Delta E_{CIE}$ standard. With respect to ΔE, smaller values are better as it indicates less change from the initial color gamut values compared to color gamut after 5 wash cycles. The values below in Table 4 are based on samples printed on a 100% cotton fabric substrate, more specifically Gildan 780 fabric. However, it is noted that acceptable values can also be obtained on other types of fabric substrates, such as cotton/polyester blend (50/50 w/w) and nylon, for example.

TABLE 4

| Fabric ID | Initial Black OD | Initial Cyan OD | ΔE Black | ΔE Cyan |
|---|---|---|---|---|
| No Coating | 1.21 | 1.19 | 16.3 | 13.8 |
| Coating 1 (pH 3.5) | 1.33 | 1.33 | 4.23 | 5.0 |
| Coating 2 (pH 7.5) | 1.30 | 1.31 | 13.8 | 18.4 |

As can be seen in Table 4, the coating compositions of the present disclosure provided increased initial black OD and color (cyan) OD right after printing at both pH 3.5 and pH 7.5 compared to uncoated fabric. However, with respect to gamut reduction (ΔE), the coating composition prepared and applied at pH 3.5 was better for both black and cyan compared to Coating 1 and the sample without any coating applied.

The present technology has been described with reference to certain examples, however, various modifications, changes, omissions, and substitutions can be made without departing from the spirit of the disclosure. It is intended, therefore, that the disclosure be limited by the scope of the following claims.

What is claimed is:

1. A fabric coating composition, consisting of:

water;

from 3 wt % to 95 wt % of an oxazoline reactive compound by dry weight including an oxazoline group;

from 3 wt % to 70 wt % of a cationic charging agent by dry weight; and a surfactant, wherein the fabric coating composition has a pH ranging from pH 2 to pH 6.

2. The fabric coating composition of claim 1, wherein the oxazoline reactive compound is an oxazoline reactive polymer including from 1 millimole to 15 millimoles of oxazoline groups per gram of oxazoline reactive polymer, and wherein the oxazoline reactive polymer has a weight average molecular weight of from 1,000 Mw to 500,000 Mw.

3. The fabric coating composition of claim 1, wherein the cationic charging agent includes a cationic polymer having a weight average molecular weight of from 1,000 Mw to 50,000 Mw and is present in the fabric coating composition in an amount ranging from 5 wt % to 30 wt % by dry weight.

4. The fabric coating composition of claim 1, wherein the cationic charging agent includes a quaternary amine-containing polymer selected from the group consisting of an epichlorohydrin amine polymer, a polydiallyldimethylammonium polymer, and a combination thereof.

5. A coated fabric print medium, comprising:

a fabric substrate; and a fabric coating layer on the fabric substrate having a 1 gsm to 10 gsm dry coating weight basis, the fabric coating layer formed from the fabric coating composition of claim 1.

6. The coated fabric print medium of claim 5, wherein the oxazoline reactive compound is an oxazoline reactive polymer with from 5% to 95% of its polymerized monomeric units including an oxazoline group.

7. The coated fabric print medium of claim 5, wherein the oxazoline reactive compound is an oxazoline reactive polymer with multiple oxazoline groups, has a weight average molecular weight of from 1,000 Mw to 500,000 Mw, and is present in the fabric coating layer in an amount ranging from 5 wt % to 85 wt % by dry weight.

8. The coated fabric print medium of claim 5, wherein the cationic charging agent includes a cationic polymer having a weight average molecular weight of from 1,000 Mw to 50,000 Mw and is present in the fabric coating layer in an amount ranging from 5 wt % to 30 wt % by dry weight.

9. The coated fabric print medium of claim 5, wherein the fabric substrate is selected from the group consisting of cotton, polyester, nylon, and a combination thereof.

10. A method of printing on fabric, comprising:

forming a coated fabric print medium by:

applying the fabric coating composition of claim 1 to a fabric substrate; and drying the applied fabric coating composition to form a fabric coating layer on the fabric substrate, the fabric coating layer having a 1 gsm to 10 gsm dry coating weight basis;

ejecting an ink composition having a pH from pH 7.5 to pH 12 onto the coated fabric print medium, the ink composition comprising a liquid vehicle including water and organic co-solvent and a pigment, wherein the pigment or a dispersant thereof includes a surface reactive group, or the ink composition further includes polymer binder with a surface reactive group, or both, wherein the surface reactive group includes carboxylate, a phenol, or a thiophenol; and opening the oxazoline group to crosslink the oxazoline reactive compound with the surface reactive group of the ink composition at the coated fabric print medium.

11. The method of claim 10, wherein the oxazoline reactive compound is present in the fabric coating layer in an amount ranging from 5 wt % to 85 wt % by dry weight and the cationic charging agent is present in the fabric coating layer in an amount ranging from 5 wt % to 30 wt % by dry weight.

12. The method of claim 10, wherein the oxazoline reactive compound is an oxazoline reactive polymer including multiple oxazoline groups and has a weight average molecular weight of from 1,000 Mw to 500,000 Mw, and wherein the cationic charging agent is a cationic polymer having a weight average molecular weight of from 1,000 Mw to 50,000 Mw.

* * * * *